E. V. BENJAMIN.
CONNECTING MEANS FOR BALE BANDS.
APPLICATION FILED AUG. 15, 1916.
1,351,991.
Patented Sept. 7, 1920.
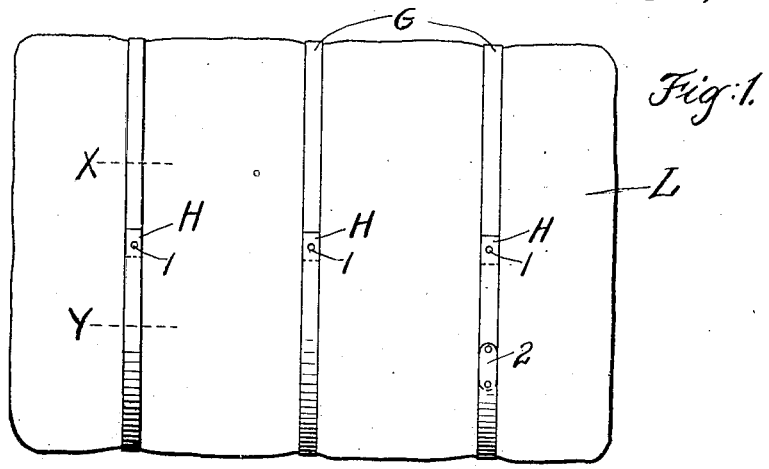
Fig. 1.
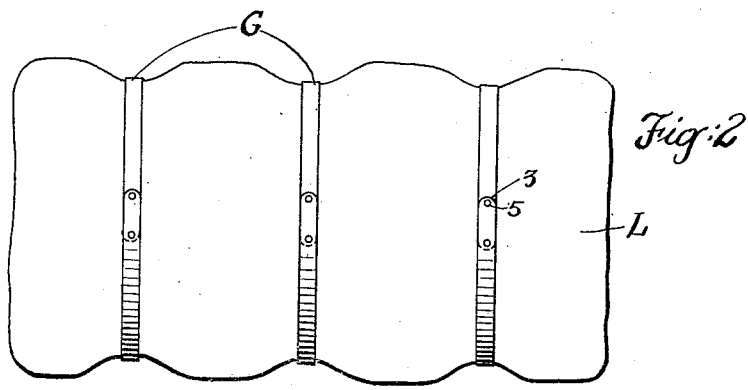
Fig. 2.
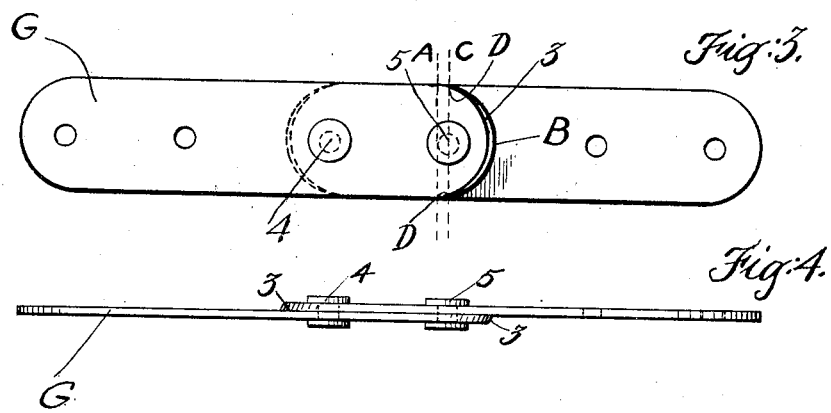
Fig. 3.
Fig. 4.
E. V. Benjamin, Inventor
By his Attorney
Charles H. Wilson

UNITED STATES PATENT OFFICE.

EMANUEL V. BENJAMIN, OF NEW ORLEANS, LOUISIANA.

CONNECTING MEANS FOR BALE-BANDS.

1,351,991.  Specification of Letters Patent.  Patented Sept. 7, 1920.

Application filed August 15, 1916. Serial No. 115,081.

*To all whom it may concern:*

Be it known that I, EMANUEL VICTOR BENJAMIN, residing at New Orleans, in the parish of Orleans and State of Louisiana, have invented certain new and useful Improvements in Connecting Means for Bale-Bands, of which the following is a specification.

This invention relates to improvements in connecting means for bale bands. The object thereof is to provide a simple, durable, strong and highly efficient means for connecting the ends of bale bands.

In applying the bands about bales of cotton and the like, it is the practice to first adjust the bands about the bale with such a degree of tightness only as is required to maintain the integrity of the bale temporarily, that is before the bale is pressed. When the bale is pressed, it becomes necessary to take up the slack in the bands. This has been accomplished by simply slicing out a portion of the length of the band, bringing the ends together and connecting them by a rivet. The portion cut out is usually the portion which was previously the joint between the two ends.

In making the cut, the end of the band has been left with sharp corners, or "spiders." Only a single rivet has been employed, and this has been positioned in a careless sort of way, irrespective of its precise distance from the ends. The result has been that the end portions of the band beyond the rivet had a tendency to turn upwardly, and to present their sharp corners in such a way as to constitute a decided menace to the persons handling the bale. The sharp corners also frequently become engaged in the material of adjacent bales and produce considerable damage.

It is an object, therefore, of this invention to overcome these objections, and to provide for such a connection between the ends of the bale bands as will produce no sharp corners, or "spiders," and which will lie flat and unobtrusive against the side of the bale at all times.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claim.

In the accompanying drawings, which are to be taken as a part of this specification, and in which I have shown merely a preferred form of embodiment of the invention:

Figure 1 is a side elevation view of a bale, the bale being shown in condition as before entering the press.

Fig. 2 is a similar view of the bale after having been pressed and the bands tightened.

Fig. 3 is an enlarged detail view illustrating the manner of connecting the bands together; and Fig. 4 is an edge view of the structure shown in Fig. 3.

Referring to the drawings for a detailed description of the structure illustrated therein, the reference character L indicates the bale, and the reference character G indicates the bands. There may be any number of bands employed, and they each comprise a strip of metal or the like arranged to encircle the bale. The adjacent ends are joined together as at 1 by means of a rivet. In some cases, the band may be made of several pieces of metal or the like, joined together by other rivets, as indicated at 2 in Fig. 1.

After the bale has been thus bound, it is carried to the press. In the pressing operation the size of the bale is of course reduced so that the bands become loose. In order to take up the resulting slack, certain portions of the bands are cut out, as for instance the portion indicated between lines X and Y in Fig. 1, and the adjacent ends are brought together and connected so as to retain the bale in its compressed condition after leaving the press.

In making the cuts at the lines X and Y, it is intended that a suitable tool shall be employed for giving to said cuts a semi-circular contour, as indicated in Fig. 3; also so as to bevel the edge of the cut, as indicated at 3 in Figs. 3 and 4. The angle of the bevel is such that when the ends are brought together, the bevel will constitute an inclined surface which merges more or less gradually from the surface of one end portion to the surface of the other end portion, as clearly indicated in Figs. 3 and 4. This will effectually dispose of any sharp corners which might otherwise occur.

The two ends are preferably connected by a pair of rivets as 4 and 5, and each of these rivets is preferably arranged nearer to the adjacent end edge of the strip than the center of the curve defined by said end edge. This is clearly illustrated in Fig. 3, in which the line A intersects the center of the curve B, while line C intersects the center of the rivet 5.

The intention of this arrangement is that in case the portion of the end of the band B beyond the rivet 4 should in any manner become bent outwardly, its line of bend, which could not be farther back than the line C, would intersect the curved end edge of the band points where said edge has begun to curve inwardly as at the points D. Any outward bending of the portion of the band beyond the rivet therefore will present only a gradually rounding smooth surface. Therefore, there is no possibility of a rough edge, or a "spider", appearing at any point.

The presence of two rivets spaced apart, substantially, as illustrated in Figs. 3 and 4, also more effectually retains the portions of the band against such bending as might produce "spiders".

It will, of course, be understood that wherever desired the connections made between the ends of bands before the portions are pressed may also be of the same nature as that shown in Figs. 2, 3 or 4, instead of the square cut ends shown at H in Fig. 1.

In some cases the square cut ends and old style connections may be used upon the same portion and at the same time as the improved connection shown at 2 in Fig. 1.

It is, of course, not intended to limit this invention to the precise details and proportions illustrated, beyond the scope of the following claims. All matter contained in the above description or shown in the accompanying drawing is to be interpreted as illustrative only and not in a limiting sense.

Having thus described my invention what I claim as new and desire to secure by Letters Patent is:

A bale-band having curved or arcuate overlapping end portions and connected together by rivets at said portions, said arcuate overlapping end portions being chamfered, toward the band, said rivets lying in the radius which is in the line of the longitudinal axis of the band and between the focus of the arc forming the extremities of the band and the periphery thereof.

In testimony whereof, I affix my signature in the presence of two witnesses.

EMANUEL V. BENJAMIN.

Witnesses:
EMMA WEINBERG,
HELEN CAREY.